United States Patent Office 3,397,228
Patented Aug. 13, 1968

3,397,228
NOVEL PREPARATION OF BORON-CONTAINING COMPOUNDS
Arthur M. Brownstein, Morristown, N.J., assignor to Allied Chemical Corporation, New York, N.Y., a corporation of New York
No Drawing. Filed July 6, 1965, Ser. No. 469,891
7 Claims. (Cl. 260—502.3)

This invention relates to a novel process for the preparation of 10-hydroxy-9-oxa-10-bora-anthracene. More particularly this invention relates to a process for the preparation of 10-hydroxy-9-oxa-10-bora-anthracene in which new boron-containing monomers can be produced as co-products by varying the molar ratios of the reactants and the catalyst.

Heretofore, 10-hydroxy-9-oxa-10-bora-anthracene has been produced by a procedure in which 2,2'-dilithiodiphenyl ether is reacted with butyl metaborate. This process is difficult to carry out, and the starting materials are expensive.

In accordance with one aspect of the present invention, it has been discovered that 10-hydroxy-9-oxa-10-bora-anthracene can be prepared by reacting phenyl ether with boron tribromide in the presence of an aluminum dust catalyst. Another aspect of this invention is the discovery that when at least two mols of boron tribromide are employed per mol of phenyl ether, and the amount of catalyst used is properly regulated, not only is the above anthracene product produced but the reaction product contains substantial quantities of two novel boron monomers, namely, 4,4'-phenoxyphenyldiboronic acid and 2,4'-phenoxyphenyldiboronic acid.

The process of this invention is illustrated by the following equation:

acids are obtained in the product. When two or more mols of boron tribromide are reacted with one mol of phenyl ether in the presence of one or more mols of aluminum dust, the boronic acids produced are 4,4'-phenoxyphenyldiboronic acid and 2,4'-phenoxyphenyldiboronic acid, both of which are novel compounds. In a typical reaction the phenyl ether/BBr$_3$/Al molar ratio was 1/3/2.5 and the product obtained was 20% by weight of 10-hydroxy-9-oxa-10-bora-anthracene, 40% by weight 4,4'-phenoxyphenyldiboronic acid, and 40% by weight of 2,4'-phenoxyphenyldiboronic acid. In the absence of aluminum catalyst, no appreciable amount of 10-hydroxy-9-oxa-10-bora-anthracene is obtained in the reaction mixture.

When the amount of catalyst is adjusted to give a product which is primarily 10-hydroxy-9-oxa-10-bora-anthracene, the molar proportion of boron tribromide to phenyl ether is not critical, and an excess of either compound can be used. When the reaction is conducted to obtain the above-mentioned diboronic acids, the molar ratio of boron tribromide to phenyl ether can be varied from the stoichiometric proportions of 2:1 up to a large excess of boron tribromide.

The reaction is preferably conducted in a solvent medium. Particularly suitable as solvents are saturated hydrocarbons such as n-decane which have a boiling point of at least 120° C. and are inert under the reaction conditions.

During the reaction a portion of the aluminum dust is converted to aluminum tribromide. As an additional catalyst, it is preferable to add a trace of aluminum tribromide at the beginning of the reaction.

The novel compounds, 4,4'-phenoxyphenyldiboronic acid and 2,4'-phenoxyphenyldiboronic acid can be used in the preparation of polymers. For instance, reaction of

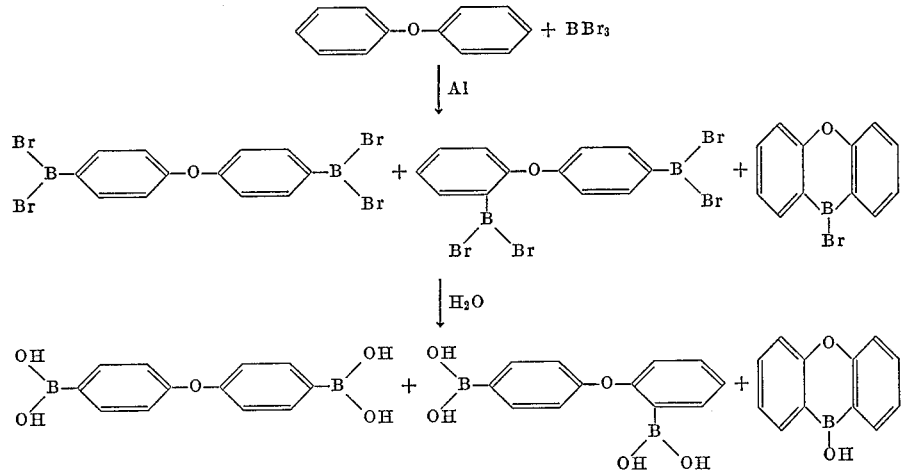

The proportion of aluminum dust catalyst to phenyl ether used in the above reaction is critical in determining the relative amounts of 10-hydroxy-9-oxa-10-bora-anthracene, 4,4'-phenoxyphenyldiboronic acid and 2,4'-phenoxyphenyldiboronic acid produced. If about 0.1 to 1.0 mol of aluminum dust catalyst are employed per mol of phenyl ether, the product obtained is almost exclusively 10-hydroxy-9-oxa-10-bora-anthracene. If more than 1.0 mol of aluminum dust is employed per mol of phenyl ether, substantial amounts of phenoxyphenylboronic these diboronic acids with tetrahydroxy compounds such as pentaerythritol will directly product a polymer. Another group of polymers useful as coatings can be produced by reacting the diboronic acids with trihydroxy compounds such as 1,1,1-trimethylolethane and 1,1,1-trimethylolpropane to form a difunctional alcohol and then reacting this alcohol with a diisocyanate such as 4,4'-diisocyanatodiphenylmethane and 2,4-diisocyanatotoluene to produce a polyurethane. The preparation of the difunctional alcohol is illustrated by the following equation showing the reaction of 4,4'-phenoxyphenyldiboronic acid with 1,1,1-trimethylolethane.

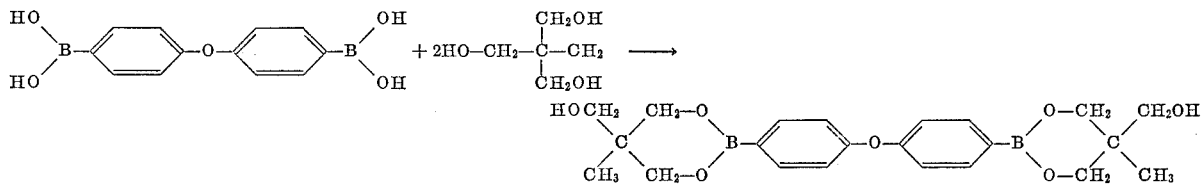

The following examples are given to further illustrate the invention, but it is to be understood that the invention is not to be limited in any way by the details described therein.

Example 1

A 250-ml. flask fitted with a reflux condenser, a magnetic stirrer and a calcium sulfate drying tube was charged with 8.5 grams (0.05 mol) of phenyl ether, 1.0 gram (0.032 mol) of aluminum dust, 50 ml. of n-decane, 27.6 grams (0.11 mol) of boron tribromide, and 0.1 gram of aluminum tribromide. The reaction mixture was heated at 150–160° C. for 4 hours with agitation. The hot reaction mixture was admixed with 200 ml. of methanol and refluxed. The reaction mixture was then charcoal-treated and filtered. The filtrate was heated to reflux and water added to cloud point. The resulting mixture was cooled in an ice bath, thereby precipitating 4.9 grams of a white solid which was collected by filtration. The precipitate was dissolved in hot methanol and filtered while hot. The filtrate was heated to reflux and water added to the cloud point. On cooling, 3.9 grams of white precipitate were formed which were recovered by filtration. A second crop of 0.2 gram of product was obtained by heating the mother liquor to reflux, adding water to the cloud point, and cooling the reaction product. The total product obtained was 4.1 grams which was determined to be almost exclusively 10-hydroxy-9-oxa-10-bora-anthracene by thin layer chromatographic analysis and infrared spectrum analysis. The product had a melting point of 258–263° C. and was completely soluble in hot benzene. The elemental analysis was as follows. Calculated: C, 73.5%; H, 4.6%; B, 5.61%. Found: C, 73.48%; H, 4.78%; B, 5.6%.

Example 2

The procedure of Example 1 was repeated employing 8.5 grams (0.05 mol) of phenyl ether, 1.0 gram (0.032 mol) of aluminum dust, 50 ml. of n-decane, 32.7 grams (0.15 mol) of boron tribromide and 0.1 gram of aluminum tribromide. A total of 4.1 grams of product was obtained which was determined to be almost exclusively 10-hydroxy-9-oxa-10-bora-anthracene by thin layer chromatographic analysis. The product had a melting point of 258–263° C. and was completely soluble in hot benzene.

Example 3

0.05 mol of phenyl ether, 0.125 mol of aluminum dust, 40 ml. of n-decane, 0.15 mol of boron tribromide, and 0.1 gram of aluminum tribromide were charged into the equipment of Example 1. The procedure of Example 1 was then repeated using a reaction time at 150–160° C. of 3 hours. A total of 12.1 grams of relatively pure product were obtained. The product was determined by thin layer chromatographic analysis to consist of 10-hydroxy-9-oxa-10-bora-anthracene, 4,4'-phenoxyphenyldiboronic acid and 2,4'-phenoxyphenyldiboronic acid in a ratio by weight of 20/40/40. Only the 10-hydroxy-9-oxa-10-bora-anthracene portion of the product was soluble in hot benzene.

Example 4

The procedure of Example 3 was repeated increasing the amount of boron tribromide to 2.20 mols. A product having the same composition as the product of Example 3 was obtained.

Example 5

Into the equipment of Example 1 were charged 0.05 mol of phenyl ether, 0.15 mol of aluminum dust, 40 ml. of n-decane, 0.15 mol of boron tribromide, 0.1 gram of aluminum tribromide. The general procedure of Example 1 was repeated using a reaction temperature of 160–170° C. for 5 hours. The product was analyzed by thin layer chromatography and found to be the same composition as the product of Example 3.

Example 6

The procedure of Example 5 was repeated except that the reaction time was decreased to 3 hours. The product was analyzed by thin layer chromatography and found to have the same composition as the product of Example 3.

Example 7

The procedure of Example 6 was repeated increasing the amount of aluminum dust to 0.20 mol. It was determined by thin layer chromatographic analysis that the product had the same composition as the product of Example 3.

Example 8

Into the equipment of Example 1 were charged 0.05 mol of phenyl ether and 0.15 mol of boron tribromide. The mixture was heated at 170° C. for 21 hours following which the reaction product was purified by the general procedure of Example 1. A total of 3.2 grams of product was obtained. The product was determined to consist almost entirely of equal amounts of 4,4'-phenoxyphenyldiboronic acid and 2,4'-phenoxyphenyldiboronic acid with only a trace of 10-hydroxy-9-oxa-10-boro-anthracene being present.

Example 9

3.87 millimoles of 4,4'-phenoxyphenyldiboronic acid were dissolved in 5 ml. of methanol and 10 ml. of benzene. The reaction mixture was heated to reflux and a solution of 4.27 millimoles of pentaerythritol in 3 ml. of water was added thereto. A white precipitate formed which was recovered by filtration. The product melted at 375°–385° C. and was found to be poly(pentaerythrityl-4,4'-phenoxyphenyldiboronate) by infrared analysis. The elemental analysis was as follows. Calculated: C, 63.3%; H, 4.97%; B, 6.83%. Found: C, 62.2%; H, 5.16%; and B, 7.15%;

Example 10

25.8 grams of 4,4'-phenoxyphenyldiboronic acid dissolved in 200 ml. of 1 N NaOH were added at ambient temperatures with stirring to 12.0 grams of 1,1,1-trimethylolethane in 100 ml. of 1 N NaOH. The clear solution is adjusted to pH by the addition of 3 N HCl. The precipitated dihydroxy boronate ester is washed carefully with water and then petroleum ether (B.P. 65–110° C.). The dihydroxy ester is dried and then heated in benzene under reflux with a 60:40 mixture of 2,4- and 2,6-diisocyanatotoluene. The polyurethane terpolymer obtained is useful as a hard surface coating.

It will be apparent that many modifications and variations may be effected without departing from the scope of the novel concepts of the present invention, and the

I claim:

1. A process for the preparation of 10-hydroxy-9-oxa-10-bora anthracene which comprises reacting phenyl ether with boron tribromide in the presence of at least 0.1 mol of aluminum dust per mol fo phenyl ether and then hydrolyzing.

2. A process as claimed in claim 1 wherein said reaction is conducted at a temperature of about 120° C. to 220° C.

3. A process as claimed in claim 1 wherein said reaction is conducted in a saturated hydrocarbon solvent which is inert under the reaction conditions.

4. A process as claimed in claim 1 wherein 0.1 to 1.0 mol of aluminum dust are present for each mol of phenyl ether.

5. A process as claimed in claim 1 wherein at least 2 mols of boron tribromide and at least 1 mol of aluminum dust are present for each mol of phenyl ether and the reaction product contains substantial portions of 4,4'-phenoxyphenyldiboronic acid and 2,4'-phenoxyphenyldiboronic acid in addition to 10-hydroxy-9-oxa-10-bora-anthracene.

6. As a new composition of matter, 4,4'-phenoxyphenyldiboronic acid having the structural formula

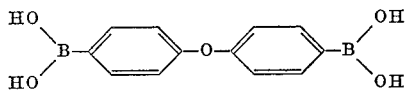

7. As a new composition of matter, 2,4'-phenoxyphenyldiboronic acid having the structural formula

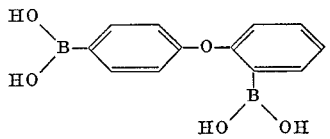

References Cited

UNITED STATES PATENTS

| 2,900,414 | 8/1959 | Muetterties | 260—500 |
| 3,072,715 | 1/1963 | Willcockson | 260—543 |
| 3,092,652 | 6/1963 | Stern et al. | 260—500 |

BERNARD HELFIN, *Primary Examiner.*

J. EVANS, *Assistant Examiner.*